(12) United States Patent
Ahn

(10) Patent No.: US 8,063,532 B2
(45) Date of Patent: Nov. 22, 2011

(54) MOTOR OF SPRING CHARGING DEVICE IN AIR CIRCUIT BREAKER

(75) Inventor: Kil Young Ahn, Daejeon (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 660 days.

(21) Appl. No.: 12/194,924

(22) Filed: Aug. 20, 2008

(65) Prior Publication Data
US 2009/0050459 A1 Feb. 26, 2009

(30) Foreign Application Priority Data
Aug. 20, 2007 (KR) .................. 10-2007-0083499

(51) Int. Cl.
*H02K 13/00* (2006.01)

(52) U.S. Cl. ....................... 310/239; 310/245

(58) Field of Classification Search .................. 310/239, 310/245, 240–244, 246, 247; *H02K 13/00*
See application file for complete search history.

(56) References Cited

U.S. PATENT DOCUMENTS

| | | | | |
|---|---|---|---|---|
| 4,074,162 A * | 2/1978 | Parzych | ...................... | 310/245 |
| 4,513,495 A * | 4/1985 | Kimberlin | ...................... | 29/597 |
| 4,546,280 A * | 10/1985 | Pfluger | ...................... | 310/68 D |
| 4,746,828 A * | 5/1988 | Nado et al. | ...................... | 310/90 |
| 5,055,728 A * | 10/1991 | Looper et al. | ...................... | 310/91 |
| 5,184,041 A * | 2/1993 | Baer et al. | ...................... | 310/239 |
| 5,818,142 A * | 10/1998 | Edleblute et al. | ...................... | 310/239 |
| 7,180,219 B2 * | 2/2007 | Xu | ...................... | 310/245 |

* cited by examiner

*Primary Examiner* — Quyen Leung
*Assistant Examiner* — Thomas Truong
(74) *Attorney, Agent, or Firm* — Lee, Hong, Degerman, Kang & Waimey

(57) ABSTRACT

Disclosed is a motor of spring charging device in air circuit breaker wherein first and second frames are formed with glass fiber-added plastic material to facilitate the tight-fitting of a bearing and a manufacturing cost of driving motor is reduced by removing a brush holder isolator which was an essential part for isolating the brush holder, and a brush holder and a brush holder insertion hole of the first frame for inserting a brush holder are structurally improved to enable the brush holder to be easily and solidly inserted into the brush holder insertion hole of the first frame, thereby reducing the labor work of a soldering for connecting the stator winding.

4 Claims, 9 Drawing Sheets

MOTOR OF SPRING CHARGING DEVICE IN AIR CIRCUIT BREAKER

CROSS-REFERENCE TO RELATED APPLICATIONS

Pursuant to 35 U.S.C. §119(a), this application claims the benefit of earlier filing date and right of priority to Korean Application No. 10-2007-0083499, filed on Aug. 20, 2007, the contents of which is incorporated by reference herein in its entirety.

TECHNICAL FIELD

The following description relates generally to a motor, and more particularly to a motor of spring charging device in air circuit breaker wherein first and second frames are formed with plastic material added with glass fiber to facilitate an insertion work of tight fit in a bearing, and a conventionally essential brush holder insulator is removed to reduce a manufacturing cost of a motor, and a brush holder and a brush holder insertion hole of the first frame into which the brush holder is inserted are structurally improved to allow the brush holder to be fixedly inserted into the brush holder insertion hole of the first frame more easily and solidly and to alleviate the laboring work of soldering for connecting to stator windings.

BACKGROUND ART

Generally, an ACB (air circuit breaker) includes a stationary contactor and a movable contactor movable to a connected position for closing a conducted circuit by contacting the stationary contactor and to an interruption (trip) position for opening the conducted circuit by being separated from the stationary contactor, and allow the stationary contactor and the movable contactor to be contacted at all times for flowing the current, but when an abnormal over-current (a large current caused by i.e., short circuit and ground fault) generated at an electric circuit such as a power transmission/distribution line and private power transforming facilities occurs, the movable contactor is swiftly separated from the stationary contactor to interrupt the current from flowing to thereby protect load units such as a motor and a transformer and an electric line against an abnormal current. The ACB also exposes the stationary and movable contactors to pull in the compressed air and to distinguish the arc generated during the occurrence of abnormal current.

As noted above, the ACB is utilized for connecting a high-voltage current to or interrupting the current from a power station or distributing station, and is mounted, if necessary, with an actuator for swiftly interrupting or separating a contact point between the stationary contactor and the movable contactor. The driving method of the actuator is largely classified into a manual manipulation method, a solenoid manipulation method and an electric spring manipulation method.

In the ACB of the electric spring manipulation method, an interruption spring is elastically connected to one side of a cam axle mounted with a charging cam connected to a link connected to a movable contactor, and a manual charging device rotating the cam axle using a manual lever or an electric charging device using a motor is connected to the cam axle. The cam axle is rotated while a rotation moment-added main energy is maximally accumulated in the interruption spring using the charging device. If necessary, a lock is released to rotate the cam axle using the accumulated energy of the interruption spring and sequentially-meshed link separates the movable contactor from the stationary contactor to interrupt the current.

FIG. 1 is a perspective view illustrating configuration of a typical ACB and FIGS. 2a, 2b and 2c are schematic views sequentially illustrating an operational state of an actuator mechanism.

Referring to FIGS. 1, 2a, 2b and 2c, the typical ACB includes a connection spring (11) selectively separating or connecting a contact point between a stationary contactor (3) and a movable contactor (5) for opening and closing a conducted circuit, an actuator mechanism (1) including a linkage (15), an interruption spring (21) and a cam axle (30), a motor (50) rotating the cam axle (30), and a charging device (40) including a decelerating gear assembly (60) and an output gear (70).

Now, referring to FIGS. 2a, 2b and 2c, the actuator mechanism (10) of the typical ACB will be described. FIG. 2a illustrates an initial state of the actuator mechanism (1) where the contact point between the stationary contactor (3) and the movable contactor (5) are opened.

Thereafter, the cam axle (30) is rotated by the driving motor (50) or a charging handle (not shown), and a driver lever (16) is rotated by rotation of a charging cam (12) meshed with the cam axle to compress the connection spring (11) to be in a state illustrated in FIG. 2b, i.e., in the state of being charged. The changing cam (12) accumulated by the connection spring (11) maintains an equilibrium of force due to an ON lever (14) contacting a connection latch (13). An ON coupling (17) contacting a connection solenoid (not shown) is in a position capable of rotating the ON lever (14).

Then, when a user presses a connection button, or rotates the ON lever (14) by allowing the connection solenoid to move the ON coupling (17) downward, the connection latch (13) releases the charging cam (12) to allow the accumulated force of the connection spring (11) to be transmitted to the linkage (15) via a driver lever (16). An open/close axis (10) is rotated clockwise to allow contact points of the stationary contactor (3) and the movable contactor (5) to be contacted therebetween via an open/close lever (20) rotating in conjunction with the open/close axis (10) and to elongate the interruption spring (21), the state of which is illustrated in FIG. 2c. The state of the contact points between the stationary contactor (3) and the movable contactor (5) being contacted, i.e., the equilibrium of force where the air breaker is connected, is maintained by an open lever (23) via the linkage (15) and an open latch (22).

Thereafter, when a user presses an interruption button (now shown) by detecting an occurrence of over-current caused by failure at an electric line, or the open lever (23) is rotated by operation of the interruption solenoid (now shown), the open latch (22) is rotated to release the linkage (15) toggled by the connection operation and to rotate the open/close axis (10) according to force elongated by the interruption spring (21), such that the contact point of the stationary contactor (3) and the movable contactor (5) is separated to form a state illustrated in FIG. 2a.

Meanwhile, FIG. 3 is a cut-away view of a typical driving motor of FIG. 1. Now, the motor using a connection spring charging device of a typical ACB will be described with reference to the accompanying drawings.

As illustrated in FIG. 3, the typical motor (50) includes a shaft (130) rotatably mounted inside a first frame and a second frame (110, 120) via a bearing (135) tight fitted into the first and second frame (110, 120) made of aluminum, a commutator (140) pressure-fitted into one side of the shaft (130), a stator winding (170) rotating the shaft (130), a brush holder (160) inserted into the first frame (110), a brush (150) contacting the commutator (140) by being inserted into the brush holder (160) so as to be elastically supported by a spring (not shown), and a brush holder isolator (180) isolating the brush holder (160) from the first frame (110).

However, the typical motor (50) thus constructed suffers from the following problems.

First, an electric wiring connected to the stator winging (170) at one side of the brush holder (160) is soldered for connecting the brush holder (160) and the stator winding (170). The problem is that it is very difficult to solder, and the motor (50) may not be properly driven due to improper soldering caused by erroneous work by a worker and the interruption operation of the ACB may not properly conducted.

Besides, the first and second frames (110, 120) are made of aluminum by die-casing method to cause a difficulty in insertion work of a bearing that is tightly fitted into the first and second frames (110, 120) for a smooth rotation of the shaft (130). Still another problem is that the manufacturing cost of the ACB increases, because a brush holder isolator (180) isolating the brush holder (160) from the first frame (110) has to be additionally mounted for isolation from the brush holder (160).

TECHNICAL SOLUTION

This disclosure is provided to solve the aforementioned problems and an object of this disclosure is to provide a motor of spring charging device in air circuit breaker wherein first and second frames are formed with glass fiber-added plastic material to facilitate the tight-fitting of a bearing and the manufacturing cost of driving motor is reduced by removing a brush holder isolator which was an essential part for isolating the brush holder. Another object is that a brush holder and a brush holder insertion hole of a first frame for inserting a brush holder are structurally improved to enable the brush holder to be easily and steadily inserted into the brush holder insertion hole of the first frame. Still another object is to alleviate the labor work of a soldering for connecting the stator winding.

In one general aspect, a motor of spring charging device in air circuit breaker comprises: a first frame formed with bearing insertion hole and a pair of brush holder insertion holes; a second frame formed with a bearing insertion hole and a shaft through hole; bearings each inserted into the bearing insertion holes formed at the first and second frames; a shaft rotatably coupled to the first and second frames via the bearings by passing through the shaft through hole of the second frame; a stator coupled to the shaft; a stator winding rotating the shaft; a brush holder connected to the commutator winding via an electric line by being inserted into the brush holder insertion hole; and a brush inserted into the brush holder in a state of being elastically supported by a spring to be brought into contact with the commutator.

Implementations of this aspect may include one or more of the following features.

The first and second frames are formed with glass fiber-added plastic material.

The brush holder may be of a rectangular cylindrical shape and may include a bottom blocking plate mounted thereunder for blocking a bottom opened by being bent through bending operation, and an electric line fixation piece for connectively fixing the electric line to an external wall by being bent through bending operation.

The brush holder insertion hole may be further formed at an inner lateral surface thereof with a stumbling sill, and the brush holder may be further formed at an external wall with a first latch for being latched by the stumbling sill, and a second latch for being latched by an upper end of the brush holder insertion hole.

The second frame may be further formed with first and second ribs for structural reinforcement of the second frame.

ADVANTAGEOUS EFFECTS

The advantageous effect of the motor of spring charging device in air circuit breaker is such that first and second frames are formed with glass fiber-added plastic material to facilitate the tight-fitting of a bearing and the manufacturing cost of driving motor is reduced by removing a brush holder isolator which was an essential part for isolating the brush holder, and a brush holder and a brush holder insertion hole of the first frame into which a brush holder is inserted are structurally improved to enable the brush holder to be easily and solidly inserted into the brush holder insertion hole of the first frame, thereby reducing the labor work of a soldering for connecting the stator winding.

DESCRIPTION OF DRAWINGS

FIG. 5c is a perspective view of a state in which the brush holder of FIG. 5a is connected to a brush and an electric line for connecting a stator winding illustrated in FIG. 5a.

MODE FOR INVENTION

Exemplary implementations of a motor of spring charging device in air circuit breaker according to the present novel concept will be described in detail with reference to the accompanying drawings.

Figure 4:
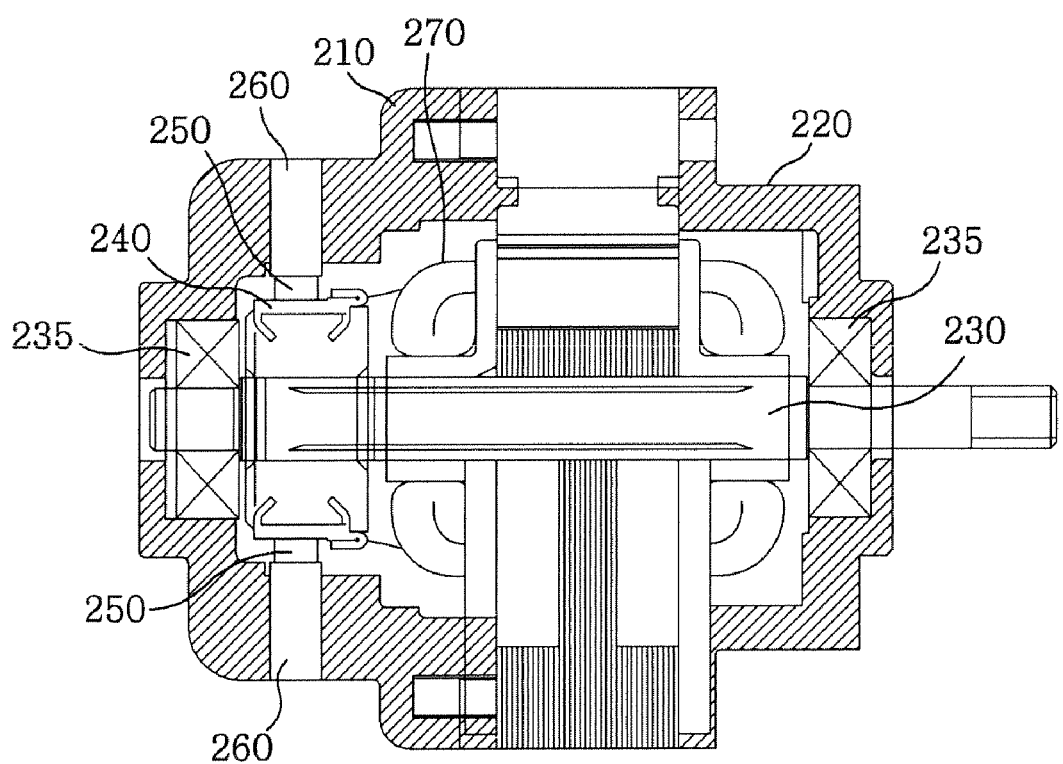
FIG. 4 is a cut-away view of a motor of a spring charging device in an air circuit breaker according to an exemplary implementation.
Figure 5A:
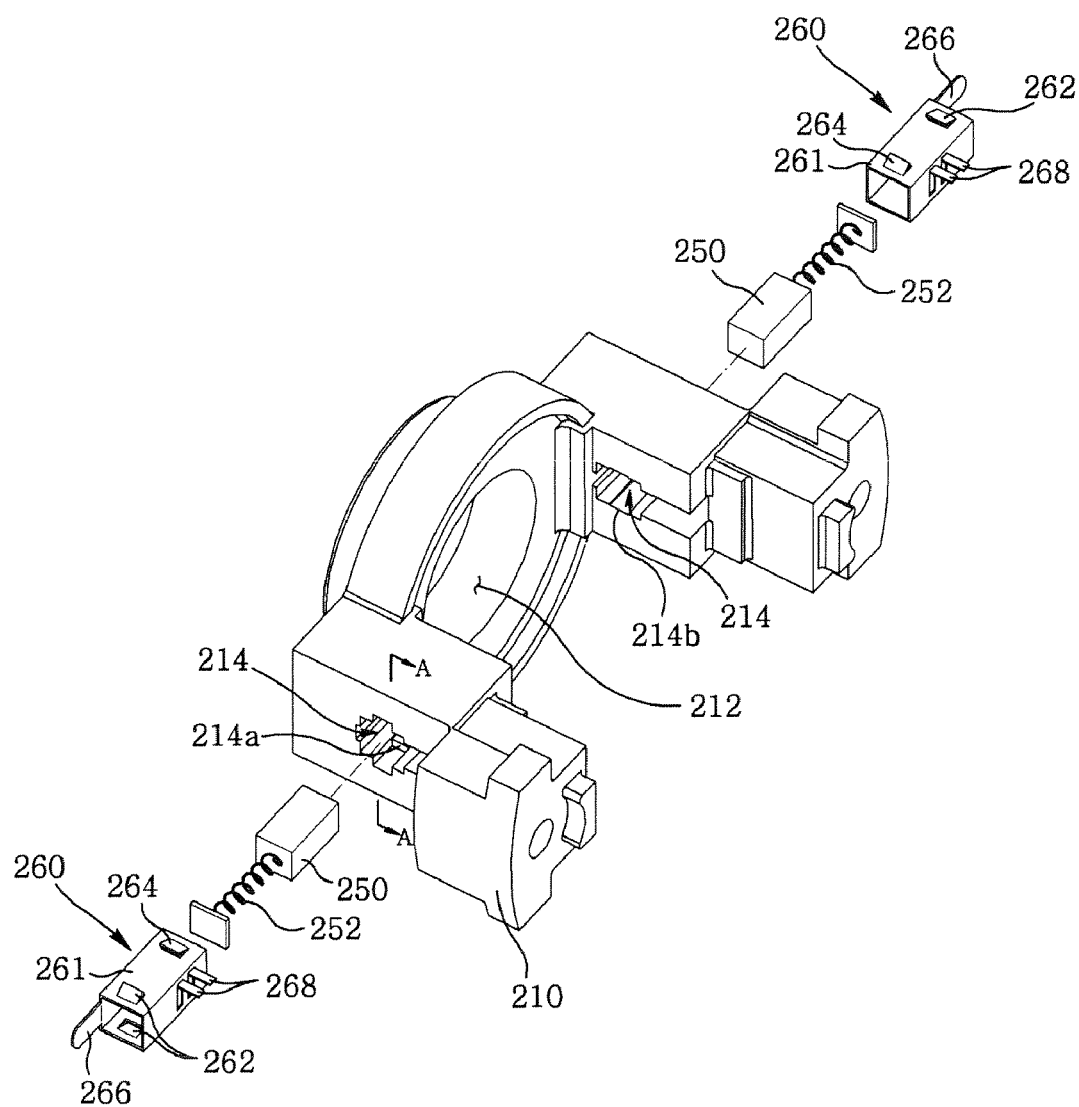
FIG. 5a is a perspective view of a first frame, a brush and a brush holder of a motor of FIG. 4.
Figure 5B:
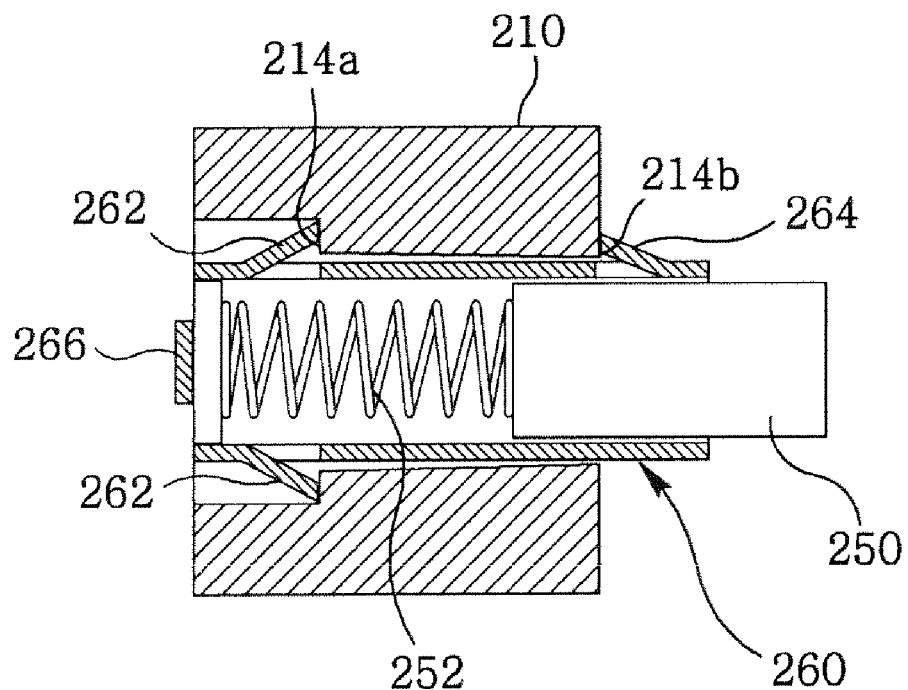
FIG. 5b is a cut-away view taken along A-A' of FIG. 5a in which a brush holder is inserted.
Figure 5C:
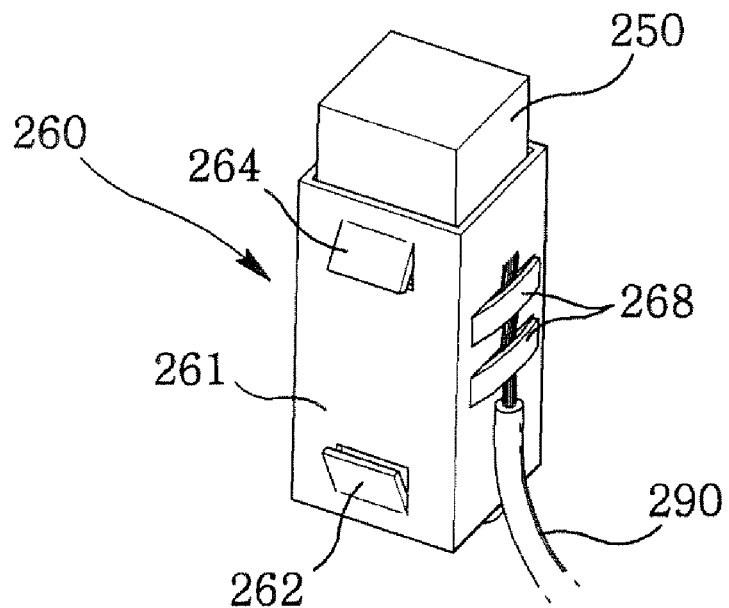
Figure 6:
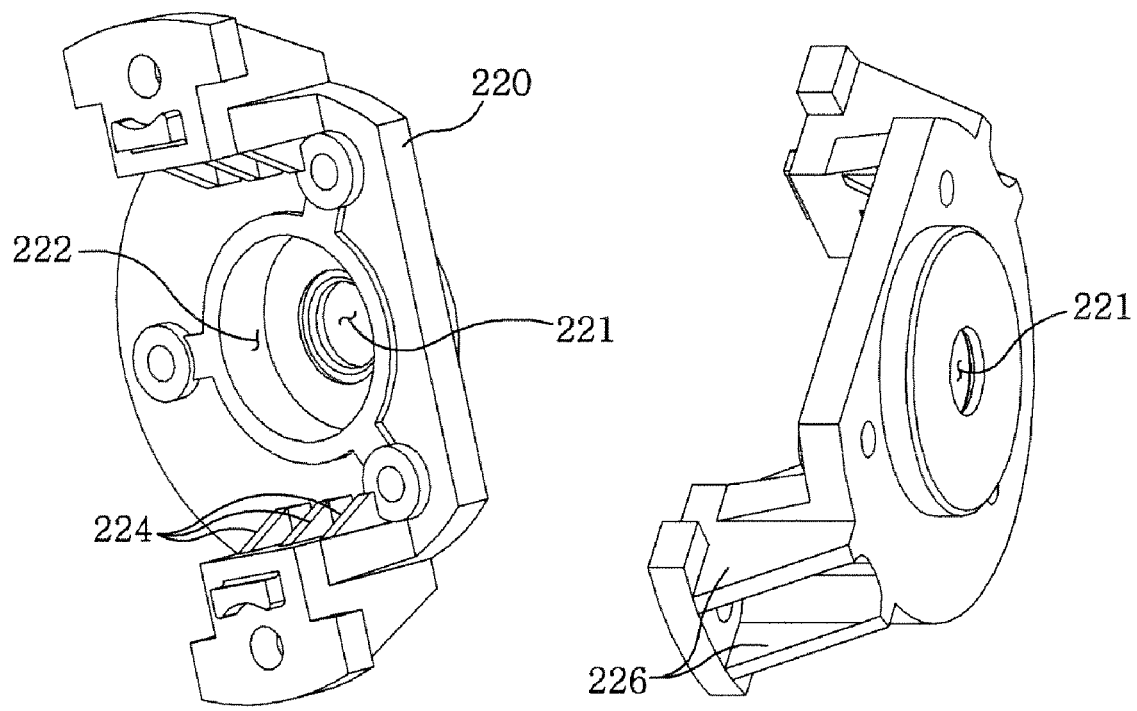
FIG. 6 is a perspective view of a second frame of the motor of FIG. 4 taken from different directions.

FIG. 4 is a cut-away view of a motor of a spring charging device in an air circuit breaker according to an exemplary implementation, FIG. 5a is a perspective view of a first frame, a brush and a brush holder of a motor of FIG. 4, FIG. 5b is a cut-away view taken along A-A' of FIG. 5a in which a brush holder is inserted, FIG. 5c is a perspective view of a state in which the brush holder of FIG. 5a is connected to a brush and an electric line for connecting a stator winding illustrated in FIG. 5a, and FIG. 6 is a perspective view of a second frame of the motor of FIG. 4 taken from different directions.

Referring to FIGS. 4 to 6, a motor (200) employed for a connection spring charging device in an air circuit breaker includes a first frame (210) formed with a bearing insertion hole (212) and a pair of brush holder insertion holes (214). A second frame (220) formed with a shaft through hole (221) and a bearing insertion hole (222) is formed at a predetermined discrete location from the first frame (210). The first and second frames (210, 220) are made of glass fiber-added plastic material. The second frame (220) is formed with first and second ribs (224, 226) for strengthening the reinforced structure.

Figure 1:
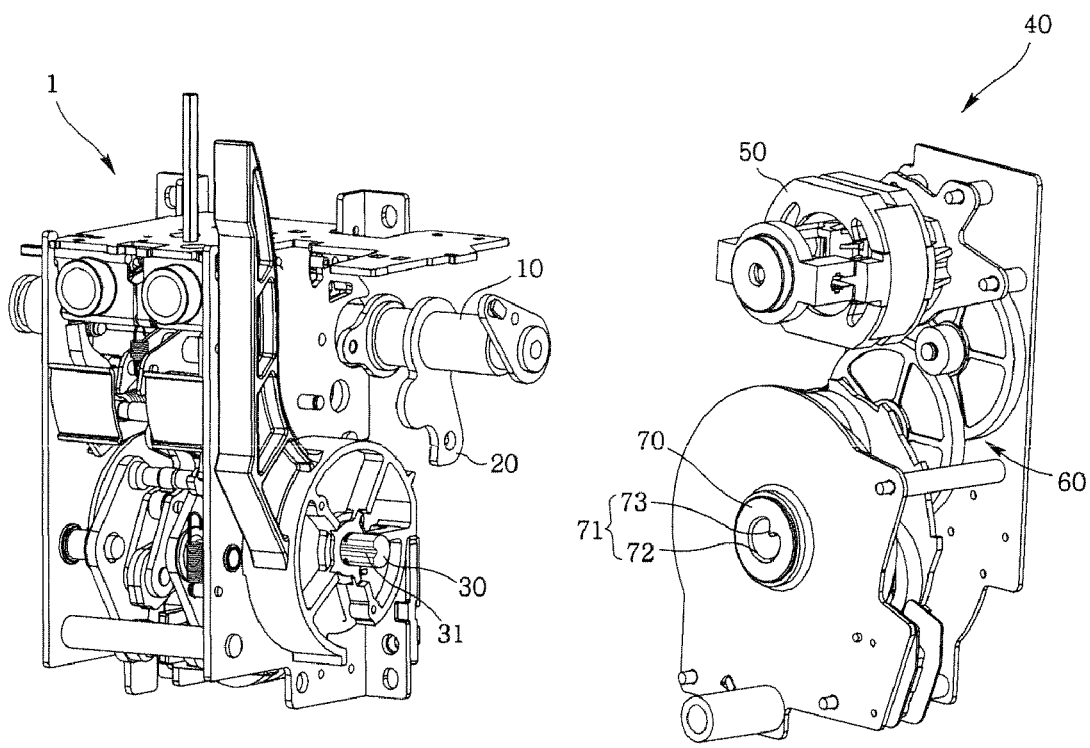
FIG. 1 is a perspective view of a typical air circuit breaker.
Figure 2A:
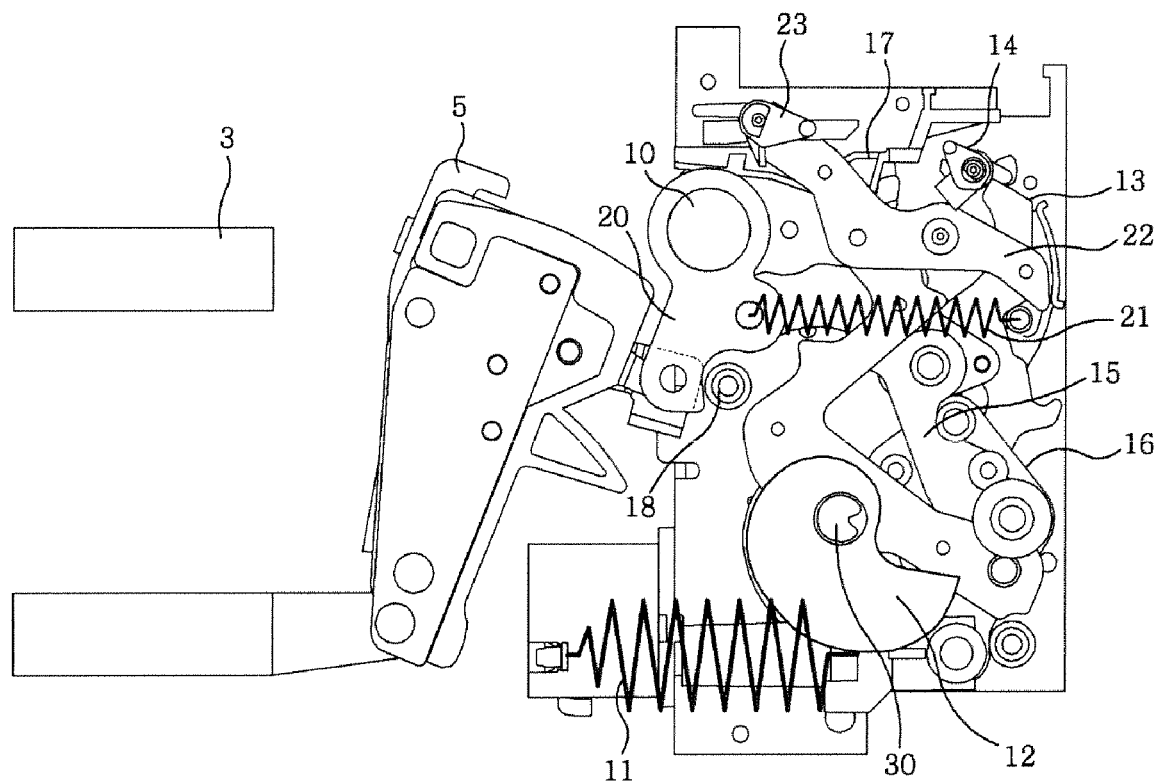
FIGS. 2a, 2b and 2c are schematic views sequentially illustrating construction and an operational state of an actuator mechanism of FIG. 1.
Figure 2B:
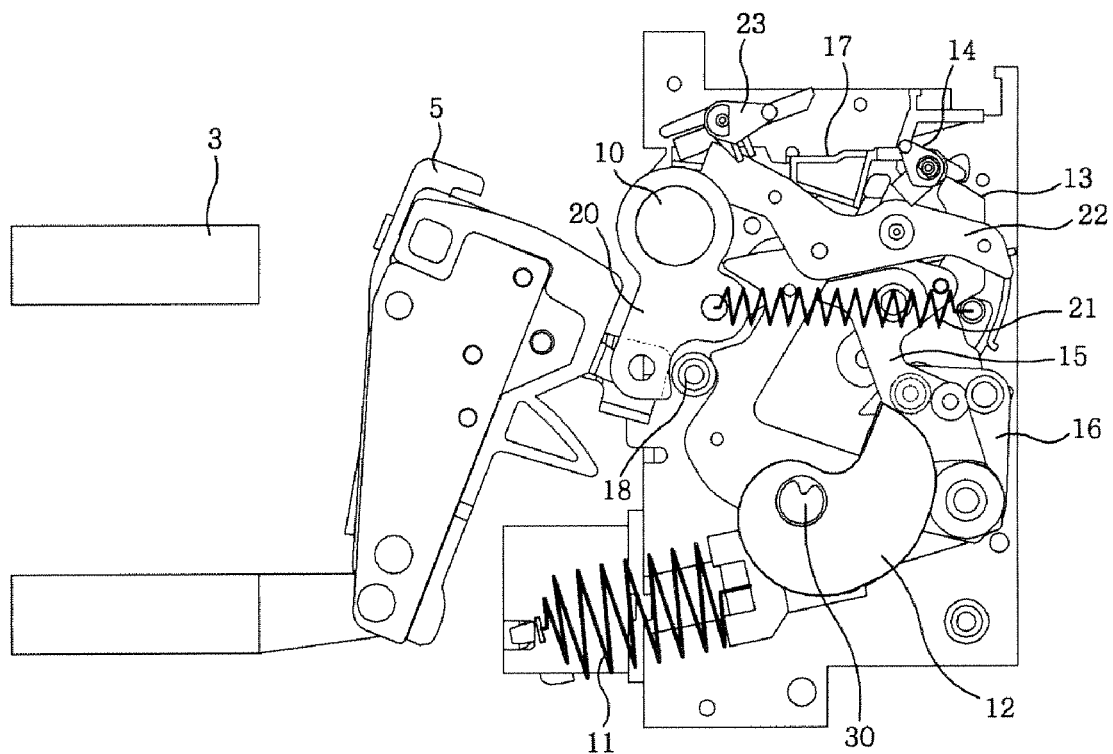
Figure 2C:
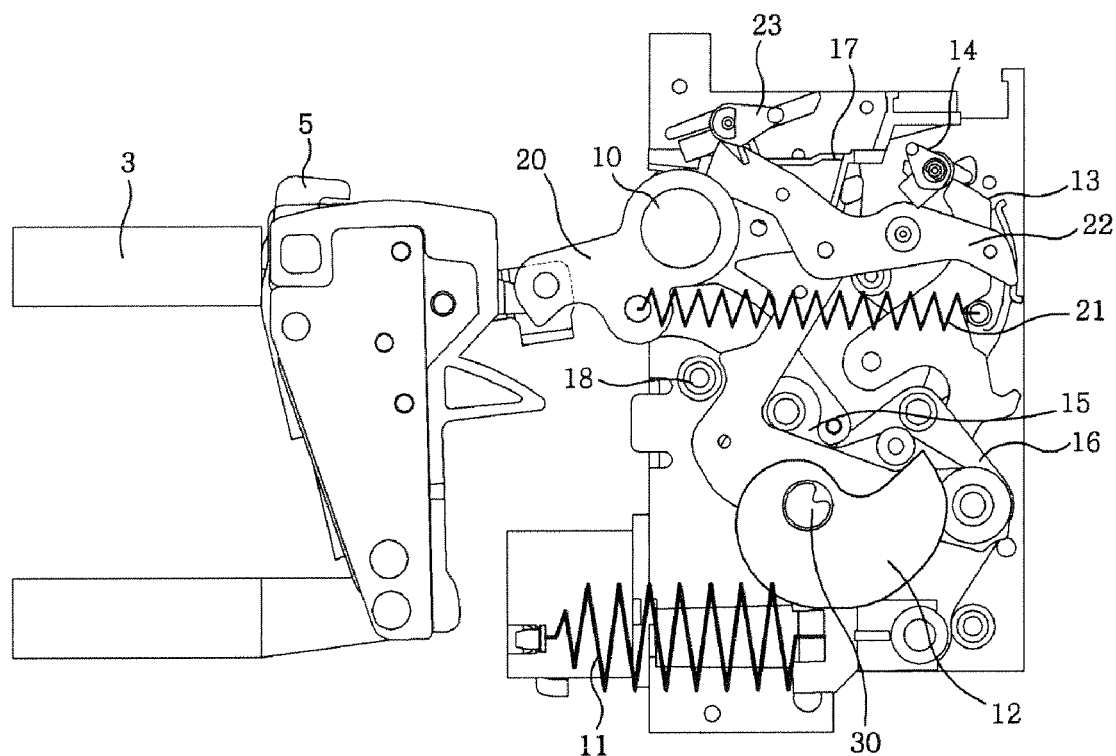

Each of the bearing insertion holes (210, 222) formed at the first and second frames (210, 222) is tight-fitted by a bearing (235). In one exemplary implementation, it is easy to tight-fit the bearing (235) because the first and second frames (212, 222) are made of glass fiber-added plastic material, although the typical first and second frames are made of aluminum An inner space formed by the first and second frames (210, 222) is disposed with a shaft (230) rotatably mounted to the first and second frames (210, 222) via the bearing (235) through the through hole (221) of the second frame (222). As illustrated in FIG. 1, the shaft (230) is connected to a decelerating gear assembly (60) to transmit a rotational force to an output gear (70). The shaft (230) is tight-fitted by a commutator (240). The shaft (230) is externally aligned with a stator winding (270) rotating the shaft (230) by forming a magnetic field in response to an applied current.

Figure 3:
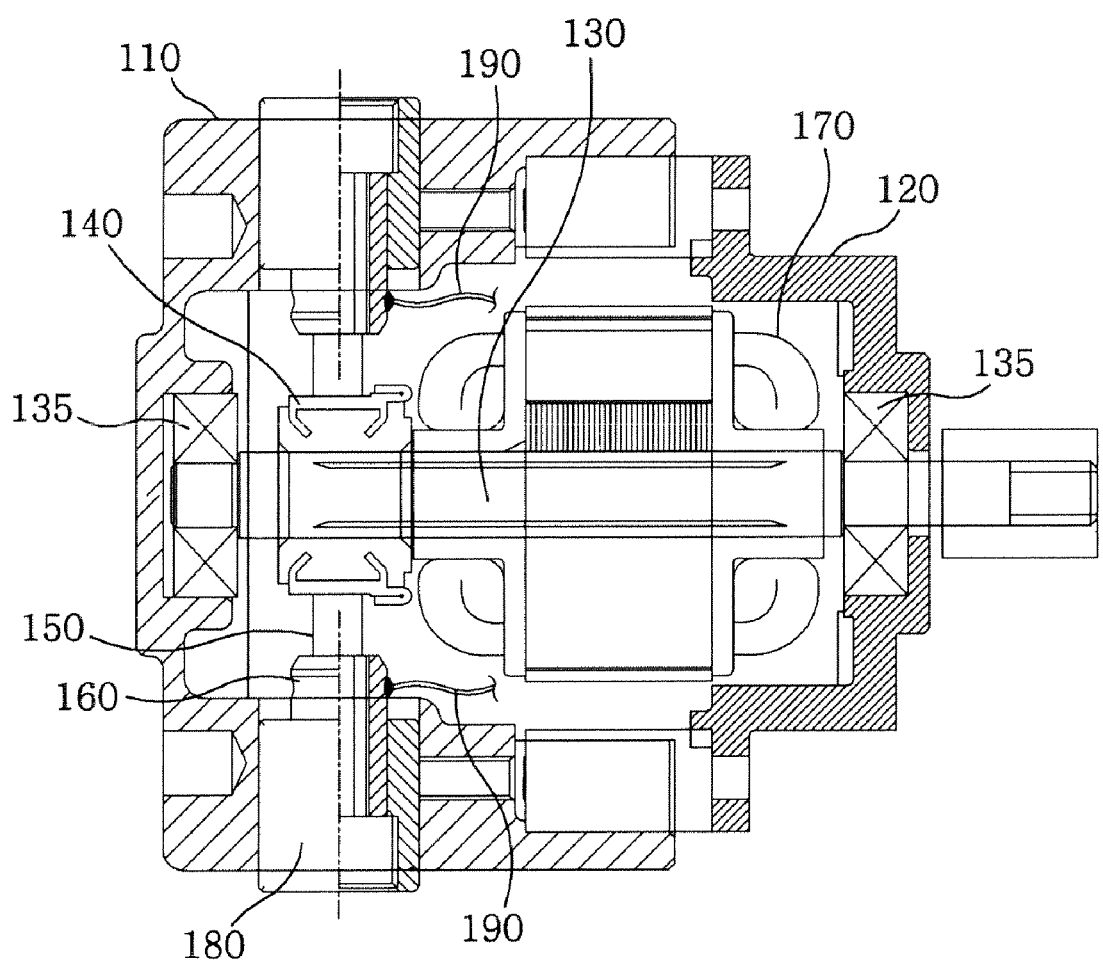
FIG. 3 is a cut-away view of a typical motor of FIG. 1.

A brush holder insertion hole (213) formed at the first frame (210) is fixed inserted by a brush holder (260) instrinsically formed with a brush (described later). In one exemplary implementation, as noted above, the first and second frames (210, 220) are formed with glass fiber-added plastic material, such that a brush holder isolator (180. see FIG. 3) is dispensed with for isolation of the brush holder that is typically needed in the prior art.

Now, referring to FIG. 5a, the brush holder (260) is of a rectangular cylindrical shape, and is mounted thereunder with a bottom blocking plate (266) for blocking a bottom opened by being bent through bending operation. In other words, a spring (252) connected to a bottom of a brush (250) inserted into the brush holder (260) is supported by bent bottom blocking plate (266), whereby the brush (250) is inserted into the brush holder in a state of being elastically supported by the spring (252). The brush (250) is so arranged as to contact the commutator (240) by the elastic action of the spring (252).

An electric line fixation piece (268) is provided at an external wall of the brush holder (260) for connectively fixing an electric line (290) for electrical connection with the stator winding (270) by being bent through bending operation. In other words, as illustrated in FIG. 5c, a distal denuded end of the electric line (290) is positioned at a lateral surface of the electrical line fixation piece (268) provided at an external wall of the brush holder (260), and the electrical line fixation piece (268) is bent to allow the denuded distal end of the electrical line (290) to be pressed to the external wall of the brush holder (260), whereby the electric line (290) can be easily fixedly connected to the brush holder (260).

As a result, the cumbersome soldering work for connecting the electric line can be alleviated and problems caused by erroneous soldering works can be avoided as well.

A pair of elastic first latches (262) may be provided at an external wall of the brush holder (260), and a stumbling sill (214a) may be formed at an inner surface of the brush holder insertion hole (214) of the first frame (210) for hitching the first latch (262). Furthermore, an elastic second latch may be provided at an external wall of the brush holder (260). As a result, when the brush holder (260) is to be inserted into the brush holder insertion hole (214) of the first frame (210) as illustrated in FIGS. 5a and 5b, the second latch (264) is hitched by an upper end (214b) of the brush holder insertion hole (214), while the first latch (262) of the brush holder (260) is hitched by the stumbling sill (214a) formed at an inner surface of the brush holder insertion hole (214), thereby allowing the brush holder (260) to be fixed at the brush holder insertion hole (214) of the first frame (210). Alternatively, when the brush holder (260) is to be pulled out from the brush holder insertion hole (214), the second latch (264) may be pressed to release the hitched state, and the brush (250) may be pushed to the left side direction on the drawing to easily pull out the brush holder (260).

While the present disclosure has been particularly shown and described with reference to exemplary implementations thereof, the general inventive concept is not limited to the above-described implementations. It will be understood by those of ordinary skill in the art that various changes and variations in form and details may be made therein without departing from the spirit and scope of the present invention as defined by the following claims.

INDUSTRIAL APPLICABILITY

The motor of spring charging device in air circuit breaker is such that first and second frames are formed with glass fiber-added plastic material to facilitate the tight-fitting of a bearing and the manufacturing cost of driving motor is reduced by removing a brush holder isolator which was an essential part for isolating the brush holder, and a brush holder and a brush holder insertion hole of the first frame for inserting a brush holder are structurally improved to enable the brush holder to be easily and solidly inserted into the brush holder insertion hole of the first frame, thereby reducing the labor work of a soldering for connecting the stator winding.

The invention claimed is:

1. A motor of a spring charging device for an air circuit breaker, the motor comprising:
   a first frame comprising a first bearing insertion hole, a first brush holder insertion hole, and a second brush holder insertion hole;
   a second frame comprising a second bearing insertion hole and a shaft through hole;
   a first bearing positioned in the first bearing insertion hole;
   a second bearing positioned in the second bearing insertion hole;
   a shaft rotatably coupled to the first and second frames via the first bearing and the second bearing and passing through the shaft through hole of the second frame;
   a commutator coupled to the shaft;
   a stator winding configured for rotating the shaft;
   a first brush holder comprising a first latch proximate a first end of the first brush holder and projecting from an external wall of the first brush holder, and a second latch proximate a second end of the first brush holder and projecting from the external wall, the first brush holder positioned within the first brush holder insertion hole and connected to the stator winding via a first electric line;
   a second brush holder comprising a first latch proximate a first end of the second brush holder and projecting from an external wall of the second brush holder, and a second latch proximate a second end of the second brush holder and projecting from the external wall, the second brush holder positioned within the second brush holder insertion hole and connected to the stator winding via a second electric line;
   a first brush positioned within the first brush holder and elastically supported by a spring for biasing the first brush into contact with the commutator; and
   a second brush positioned within the second brush holder and elastically supported by a spring for biasing the second brush into contact with the commutator, wherein the first brush holder insertion hole comprises a stumbling sill at an inner lateral surface of the first brush holder insertion hole, wherein the second brush holder insertion hole comprises a stumbling sill at an inner lateral surface of the second brush holder insertion hole, wherein the first latch of the first brush holder is configured for latching with the stumbling sill of the first brush holder insertion hole, wherein the second latch of the first brush holder is configured for latching with an upper end of the first brush holder insertion hole, wherein the first latch of the second brush holder is configured for latching with the stumbling sill of the second brush holder insertion hole, and wherein the second latch of the second brush holder is configured for latching with an upper end of the second brush holder insertion hole.

2. The motor of claim 1, wherein:

the first frame further comprises a plastic material and glass fiber; and the second frame further comprises a plastic material and glass fiber.

3. The motor of claim 1, wherein:

the first brush holder further comprises a rectangular shape and includes a bottom blocking plate for blocking an opening at a bottom of the first brush holder, and an electric line fixation piece for connectively fixing the first electric line to the external wall of the first brush holder through a bending operation, the bottom blocking plate formed through a bending operation; and the second brush holder comprises a rectangular shape and includes a bottom blocking plate for blocking an opening at a bottom of the second brush holder, and an electric line fixation piece for connectively fixing the second electric line to the external wall of the second brush holder through a bending operation, the bottom blocking plate formed through a bending operation.

4. The motor of claim 1, wherein the second frame further comprises a first rib portion and a second rib portion.

* * * * *